United States Patent
Liao et al.

(10) Patent No.: US 12,480,102 B2
(45) Date of Patent: Nov. 25, 2025

(54) GENETIC STRAIN FOR PRODUCING 3-AMINOISOBUTYRIC ACID

(71) Applicant: Nanjing Nutrabuilding Bio-Tech Co., Ltd., Nanjing (CN)

(72) Inventors: Qilin Liao, Nanjing (CN); Jian Zhang, Nanjing (CN)

(73) Assignee: NANJING NUTRABUILDING BIO-TECH CO., LTD., Nanjing (CN)

( * ) Notice: Subject to any disclaimer, the term of this patent is extended or adjusted under 35 U.S.C. 154(b) by 576 days.

(21) Appl. No.: 17/761,167

(22) PCT Filed: Nov. 27, 2019

(86) PCT No.: PCT/CN2019/121262
§ 371 (c)(1),
(2) Date: Mar. 16, 2022

(87) PCT Pub. No.: WO2021/102737
PCT Pub. Date: Jun. 3, 2021

(65) Prior Publication Data
US 2023/0028933 A1 Jan. 26, 2023

(51) Int. Cl.
C12N 9/10 (2006.01)
C12N 15/70 (2006.01)
C12P 13/04 (2006.01)

(52) U.S. Cl.
CPC .......... *C12N 9/1007* (2013.01); *C12N 15/70* (2013.01); *C12P 13/04* (2013.01); *C12Y 201/01041* (2013.01)

(58) Field of Classification Search
CPC ...... C12N 9/1007; C12N 15/70; C12N 9/001; C12P 13/04; C12Y 201/01041; C12Y 103/01071; Y02A 50/30
See application file for complete search history.

(56) References Cited

FOREIGN PATENT DOCUMENTS

| CN | 101210230 A | 7/2008 |
|---|---|---|
| CN | 103898035 A | 7/2014 |
| CN | 108998401 A | 12/2018 |
| EP | 3415628 A1 | 12/2018 |

OTHER PUBLICATIONS

Bornscheuer et al. Curr Protoc Protein Sci. Nov. 2011; Chapter 26: Unit26.7 (Year: 2011).*
Neelakandan AK, Song Z, Wang J, Richards MH, Wu X, Valliyodan B, Nguyen HT, Nes WD. Cloning, functional expression and phylogenetic analysis of plant sterol 24C-methyltransferases involved in sitosterol biosynthesis. Phytochemistry. Dec. 2009;70(17-18):1982-98. doi: 10.1016/j.phytochem.2009.09.003. (Year: 2009).*
Seffernick JL, de Souza ML, Sadowsky MJ, Wackett LP. 2001. Melamine Deaminase and Atrazine Chlorohydrolase: 98 Percent Identical but Functionally Different. J Bacteriol183:.https://doi.org/10.1128/jb.183.8.2405-2410.2001 (Year: 2001).*
Tang S, Edwards EA. Identification of Dehalobacter reductive dehalogenases that catalyse dechlorination of chloroform, 1,1,1-trichloroethane and 1,1-dichloroethane. Philos Trans R Soc Lond B Biol Sci. Mar. 11, 2013;368(1616):20120318. doi: 10.1098/rstb.2012.0318. PMID: 23479748; PMCID: PMC3638459. (Year: 2012).*
Sadowski MI, Jones DT. The sequence-structure relationship and protein function prediction. Curr Opin Struct Biol. Jun. 2009;19(3):357-62. doi: 10.1016/j.sbi.2009.03.008. Epub May 4, 2009. PMID: 19406632. (Year: 2009).*
Shi J, Gonzales RA, Bhattacharyya MK. Identification and characterization of an S-adenosyl-L-methionine: delta 24-sterol-C-methyltransferase cDNA from soybean. J Biol Chem. Apr. 19, 1996;271(16):9384-9. doi: 10.1074/jbc.271.16.9384. PMID: 8621604. (Year: 1996).*

* cited by examiner

*Primary Examiner* — Robert B Mondesi
*Assistant Examiner* — Alexander B Pastora
(74) *Attorney, Agent, or Firm* — ANOVA LAW GROUP PLLC

(57) ABSTRACT

The present invention discloses a S-adenosyl-L-methionine δ24-sterol-C-methyltransferase mutant C24MTgm-M11. Strain MG1655 (ΔptsG ΔfumAC ΔfumB, panD, aspA, C24MTgm) is constructed based on the polynucleotide encoding the enzyme mutant. Strain MG1655 (Δpts GΔfumAC ΔfumB, panD, aspA, C24MTgm-M11) can produce 480 mg/L 3-aminoisobutyric acid under shake flask fermentation. Compared to the wild type strain C24MTgm, the strain containing mutant C24MTgm-M11 has a significantly improved ability to produce 5.8 times' 3-aminobutyric acid.

2 Claims, 1 Drawing Sheet
Specification includes a Sequence Listing.

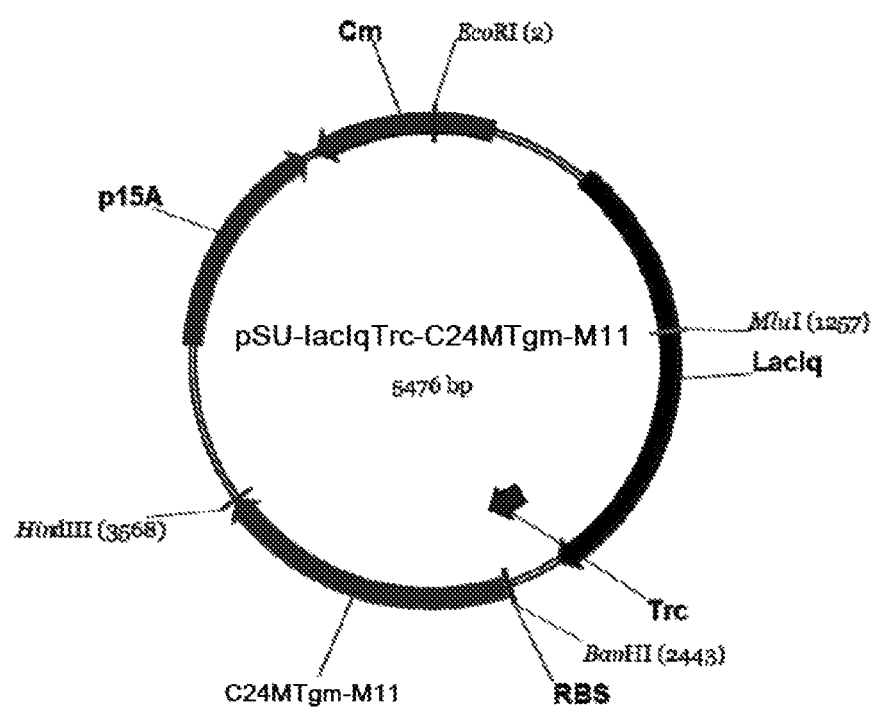

GENETIC STRAIN FOR PRODUCING 3-AMINOISOBUTYRIC ACID

CROSS-REFERENCE TO RELATED APPLICATION

This application is the US national phase of International Application No. PCT/CN2019/121262, filed on Nov. 27, 2019, the contents of which are incorporated herein by reference in their entirety.

FIELD OF THE INVENTION

The present discloser relates to the field of metabolic engineering, in particular to a method for constructing a 3-aminoisobutyric acid producing strain, and in particular to a method for producing 3-aminoisobutyric acid by genetic strain.

DESCRIPTION OF THE PRIOR ARTS 3-aminoisobutyric acid, also known as 3-aminoisobutyric acid (β-AIB) or 3-amino-2-methylpropionic acid, has the chemical formula as follows:

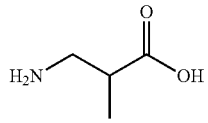

3-aminoisobutyric acid is a non-protein amino acid, a metabolite of thymine and valine, excreted in the urine. The R-configuration is derived from thymine and the S configuration is derived from valine, and the R-configuration in the urine accounts for more than 90%. It has been found that β-AIB, as the first representative small molecule of myokine in the non-adrenergic activator family of white adipose tissue thermogenic process, has a good pharmaceutical potential for type II diabetes and metabolic diseases. In addition, 3-aminoisobutyric acid can be used as a chemical raw material and a pharmaceutical intermediate. As a raw material for organic synthesis, it has more than 20 kinds of upstream products and more than 10 kinds of downstream products. The application and research in the field of pharmaceutical intermediates is very extensive.

At present, 3-aminoisobutyric acid is mainly prepared by chemical methods. Although the yield of the product is high, an expensive catalyst and a large amount of hydrochloric acid are required in the synthesis steps, and at the same time, highlytoxic cyanide is generated, which causes great pollution to the environment. As the requirements of environmental protections increase, it is necessary to develop environmentally friendly green production methods. CN108998401A disclosed a method for producing β-AIB by the fermentation of Escherichia coli engineering strain in 2018. In the patent, three genes of ptsG, fumAC and fumB were knocked out from wild strain MG1655, and three genes were highly expressed including L-aspartic acid α-decarboxylase gene panD, aspartase gene aspA and methyltransferase gene C24MTgm. The obtained engineering strain can produce 100 mg/L β-AIB in the shake flask, which provides the possibility for biological preparation of β-AIB. But the amount of β-AIB produced by the engineered strain is low, so that there is still much room for improvement.

SUMMARY OF THE INVENTION

In order to overcome the problem of pollution caused by the chemical synthesis method of 3-aminoisobutyric acid and the low production of 3-aminoisobutyric acid by fermentation, the present invention utilized an S-adenosyl-L-methionine δ24-sterol-C-methyltransferase mutant C24MTgm-M11 from *Glycine max*, constructed its overexpression vector pSU-laclqTrc-C24MTgm-M11, and introduced it into MG1655 (ΔptsG ΔfumA CΔ fumB, panD, aspA) (see in CN108998401A), the obtained expression strain can significantly increase the yield of 3-aminoisobutyric acid fermentation.

Specifically, the present invention including the following technical solutions:

A method for constructing a 3-aminoisobutyric acid producing strain, comprising the steps:

A. Construction of an expression plasmid pSU-laclqTrc-C24MTgm-M11 of S-adenosyl-L-methionine δ24-sterol-C-methyltransferase mutant C24MTgm-M11 derived from *Glycine max*;

B. The plasmid obtained in the step A was transformed into strain MG1655 (ΔptsGΔfumACΔfumB, panD, aspA) to obtain a genetic engineered strain MG1655 (ΔptsGΔfumAC fumB, panD, aspA, C24MTgm-M11).

In one embodiment, the present invention provides herein a methyltransferase enzyme mutant C24MTgm-M11, which is derived from a wild type enzyme C24MTgm of SEQ ID NO: 1, wherein the proline 135 is replaced by alanine, leucine 136 is replaced by alanine and phenylalanine 213 is replaced by serine.

Preferably, the methyltransferase enzyme mutant C24MTgm-M11 comprises the amino acid sequence of SEQ ID NO: 3.

In other embodiments, the present invention provides polynucleotide encoding the enzyme mutant C24MTgm-M11, comprising the nucleic acid sequence of SEQ ID NO: 4.

In other embodiments, the present invention provides a methyltransferase enzyme mutant expression vector, the methyltransferase enzyme mutant (C24MTgm-M11 is encoded by a polynucleotide comprising nucleic acid sequence of SEW ID NO:4. The polynucleotide is located on an expression vector.

Preferably, the vector is pSU-laclqTrc-C24MTgm-M11 plasmid comprising the polynucleotide of the present invention.

In other embodiments, the present invention provides a host cell comprising the vector of the present invention.

Preferably, the host cell is *E coli* MG1655 (ΔptsG ΔfumAC ΔfumB, panD, aspA, C24MTgm-M11).

The present invention also provides a use of the methyltransferase enzyme mutant C24MTgm-M11 or the vector or the host cell of the present invention for producing 3—the method for producing 3-aminoisobutyric acid is fermentation.

the use of the present invention comprises the following steps:

(a) Acquisition of C24MTgm-M11 gene,
(b) Construction of C24MTgm-M11 expression vector,
(c) Construction the host cell,
(d) inoculating the host cell into a culture medium, and then adding glucose as a substrate, which is converted to form 3-aminoisobutyric acid by the host cell.

Preferably, the fermentation medium consists of the following: $(NH_4)_2SO_4$ 15 g/L, $KH_2PO_4$ 5.0 g/L, Na$_2$HPO$_4$·12H$_2$O 15 g/L, MgSO$_4$·7H$_2$O 1.0 g/L, yeast extract 1.0 g/L, glucose 20 g/L, pH 7.0.

The genetic strain can be directly used as a fermentation intermediate to produce 3-aminoisobutyric acid by fermentation, it can also be used as a starting strain for screening to obtain a new strain with further improved production capacity of 3-aminoisobutyric acid.

The invention adopts *Escherichia coli* as an initial strain, and uses molecular biological technology to modify the genome, and the recombinant engineering strain can obtain 3-aminoisobutyric acid by fermentation. It was verified by shake flask fermentation that the highest yield of 3-aminoisobutyric acid can reach 870 mg/L, indicating that the method of the present invention has industrial application potential.

FIGURES

FIG. 1: The structure of expression plasmid pSU-laclqTrc-C24MTgm-M11 constructed by the present invention for the C24MTgm-M11 gene.

DETAILED DESCRIPTION OF THE PREFERRED EMBODIMENTS

While the present disclosure is capable of being embodied in various forms, the description below of several embodiments is made with the understanding that the present disclosure is to be considered as an exemplification of the claimed subject matter, and is not intended to limit the appended claims to the specific embodiments illustrated and/or described, and should not be construed to limit the scope or breadth of the present disclosure. The headings used throughout this disclosure are provided for convenience only and are not to be construed to limit the claims in any way. Embodiments illustrated under any heading may be combined with embodiments illustrated under any other heading.

Definitions

The present invention relates to the addition amount, content and concentration of various substances, wherein the percentages are referred to as mass percentages unless otherwise specified.

In the present invention, the term "*E. coli* MG1655", "original strain MG1655" have the same meaning and refer to the original strain which has not been genetically engineered.

In the present invention, the term "gene knockout strain MG1655" and "MG1655(ΔptsG ΔfumAC ΔfumB)" have the same meaning and refer to the strain in which the ptsG, fumAC, fumB genes have been knocked out in the *E. coli* MG1655 genome.

C24MTgm-M11 mutant in the present invention is S-adenosyl-L-methionine δ24-sterol-C-methyltransferase mutant constructed from wild-type S-adenosyl-L-methionine δ24-sterol-C-methyltransferase (C24MTgm). It is a new protein with several individual amino acids replaced in the SEQ ID NO: 1. Therefore, the term "C-methyltransferase" herein may also be referred to as "S-adenosyl-L-methionine δ24-sterol-methyltransferase mutant", which means the same meaning and can be used interchangeably.

The C24MTgm-M11 mutant from soybean was obtained by a rationally designed directed evolution method. C24MTgm-M11 mutant, which is derived form a wild type C24MTgm, wherein proline is replaced by alanine at position 135, leucine is replaced by alanine at position 136 and phenylalanine is replaced by serine at position 213. After the above steps, and a mutant having the amino acid sequence of SEQ ID NO: 3 in the present invention was obtained.

In the present invention, the nucleic acid sequence SEQ ID NO: 4 is obtained by a site-directed mutagenesis using the nucleic acid sequence SEQ ID NO: 2 of the wild type C24MTgm gene as a template.

The present invention constructs the nucleic acid sequence of C24MTgm-M11 into the expression vector of pSU-laclqTrc-C24MTgm-M11 containing the trc promoter, and transforms the expression plasmid into MG1655 (ΔptsG ΔfumAC ΔfumB, panD, aspA) to obtain transformant MG1655 (ΔptsG ΔfumAC ΔfumB, panD, aspA, C24MTgm-M11).

It was found that the ability of transformant MG1655 (ΔptsG ΔfumAC ΔfumB, panD, aspA, C24MTgm-M11) to produce 3-aminoisobutyric acid was significantly improved compared to the MG1655 (ΔptsG ΔfumAC ΔfumB, panD, aspA, C24MTgm) constructed by wild-type gene C24MTgm.

Preparation and Examples

General Method

Materials and Method

In the present invention, the whole gene synthesis, primer synthesis and sequencing was done by GENEWIZ©, Inc. in Suzhou, China Molecular biology experiments include plasmid construction, restriction enzyme digestion, ligation, competent cell preparation, transformation, medium preparation, etc., mainly refer to "Molecular Cloning: A Laboratory Manual" (Third Edition), J. F. Sambrook, D. W. Russell edited, translated by Huang Peitang et al., Science Press, Beijing, 2002).

For example, the methods of transformation of competent cell and the preparation of competent cell are all referred to Chapter 1, page 96 of the "Molecular Cloning: A Laboratory Manual" (Third Edition). Specific experimental conditions can be determined by simple tests if necessary.

Enzyme KOD FX© for PCR involved in the examples was purchased from Toyobo© Co., Ltd., and the restriction endonuclease was purchased from ThermoFisher©, Gibson assembly kit was purchased from NEB©, and the Axygen© DNA purification and plasmid extraction kit was purchased from Corning© Incorporated Company. The experimental operation was carried out according to the product instruction manual.

Culture Medium and Buffer

LB medium: 10 g/L tryptone, 10 g/L sodium chloride, 5.0 g/L yeast extract (solid medium added 20 g/L agar powder, pH=7.0)

The fermentation medium: (NH$_4$)$_2$SO$_4$ 15 g/L, KH$_2$PO$_4$ 5.0 g/L, Na$_2$HPO$_4$·12H$_2$O 15 g/L, MgSO$_4$·7H$_2$O 1.0 g/L, 1.0 g/L yeast extract, 20 g/L glucose, pH=7.0

In the following examples, when an antibiotic-containing medium was used, the final concentration of the antibiotic was ampicillin 100 g/ml, and chloramphenicol 40 g/ml. The corresponding antibiotic was added according to the characteristics of the transformed plasmid.

20× electro transfer stock solution: 80 g/L glycine, 2% Tween 80.

Culture Condition

The solid medium was statically cultured at 37° C. The liquid medium was cultured at 37° C. and shaken at 230 rpm.

Analytical Method for 3-aminoisobutyric Acid

Pre-column derivatization of the sample with o-phthalaldehyde as a derivatizing agent, the column is Agilent SB-C18, and the mobile phase is sodium acetate (concentration is 2.871 g/L) in 30% of methanol aqueous solution, temperature of column is 30° C., detection wavelength is 334 nm, detection time is 10 min, retention time is 5.1 min.

Example 1: Acquisition of C24MTgm-M11 Gene

Plasmid pSU-laclqTrc-C24MTgm disclosed in patent CN108998401A was used as template. KOD-FX© PCR amplification was carried out with C24MTgm-F/135A136A-R, 135A136A-F/213 S-R, 213 S-F/C24MTgm-R as primers, respectively. The fragment C24MTgm-P1/C24MTgm-P2/C24MTgm-P3 was obtained.

And then three fragments of C24MTgm-P1/C24MTgm-P2/C24MTgm-P3 were used as templates, C24MTgm-F/C24MTgm-R was used as primer for overlapping PCR, and finally obtain C24MTgm-M11 gene. The primer sequences used above are as follows:

```
C24MTgm-F:
                                    SEQ ID NO: 5
5'-CCATGGATCCAGGAGGTAAAAAAACATGCAGAAGAAAAAGAAAAATC

GCAACGAG-3',

C24MTgm-R:
                                    SEQ ID NO: 6
5'-CTAGAAAGCTTTTAATTACGATCCAGATCCGGTTTACGG-3'.

135A136A-F:
                                    SEQ ID NO: 7
5'-GATGTGGGTTGTGGCATTGGTGGCGCAGCACGTGAAATCAGCCGCTT

TAGCAG-3'

135A136A-R:
                                    SEQ ID NO: 8
CTGCTAAAGCGGCTGATTTCACGTGCTGCGCCACCAATGCCACAACCCAC

ATC-3'

213S-F:
                                    SEQ ID NO: 9
5'-CTGCTACAAAGAGATCAGCCGCGTGCTGAAACCGGGCCAG-3'

213S-R:
                                    SEQ ID NO: 10
5'-CTGGCCCGGTTTCAGCACGCGGCTGATCTCTTTGTAGCAG-3'
```

Example 2: Construction of C24MTgm-M11 Expression Vector

The pSU-laclqTrc-C24MTgm plasmid was digested with BamHI/HindIII to recover a 4351 bp fragment. The C24MTgm-M11 gene fragment constructed in Example 1 was digested with BamHI/HindIII and cloned into the recombinant plasmid fragment to obtain C24MTgm-M11 expression vector. The pSU-laclqTrc-C24MTgm-M11 expression plasmid has a structure as shown in FIG. 1.

Example 3: Construction of 3-aminoisobutyric Acid Producing Strain

The pSU-laclqTrc-C24MTgm-M11 expression plasmid constructed in Example 2 was transformed into the E. coli strain MG1655 (ΔptsGΔfumACΔfumB, panD, aspA) by electroporation (the strain was from the patent CN108998401A), and then the strain MG1655 (ΔptsG ΔfumAC ΔfumB, panD, aspA, C24MTgm-M11) was obtained.

Example 4: Fermentation of Strain

The fermentation can use glucose as a carbon source. For example, the fermentation medium consisted of the following: $(NH_4)_2SO_4$ 15 g/L, $KH_2PO_4$ 5.0 g/L, $Na_2HPO_4 \cdot 12H_2O$ 15 g/L, $MgSO_4 \cdot 7H_2O$ 1.0 g/L, yeast extract 1.0 g/L, glucose 20 g/L, pH 7.0.

The original strains MG1655, MG1655 (ΔptsGΔfumACΔfumB, panD, aspA, C24MTgm), and MG1655 (ΔptsGΔfumACΔfumB, panD, aspA, C24MTgm-M11) were cultured and fermented respectively. The fermentation medium was loaded with 30/250 ml, 37° C., 230 rpm. Fermentation was carried out for 24-32 h, and the content of 3-aminoisobutyric acid was measured.

Analytical method for 3-aminoisobutyric acid: pre-column derivatization of the sample with o-phthalaldehyde as a derivatizing agent, the column is Agilent SB-C18, and the mobile phase is sodium acetate (concentration is 2.871 g/L) in 30% of methanol aqueous solution, temperature of column is 30° C., detection wavelength is 334 nm, detection time is 10 min, retention time is 5.1 min.

The results showed that strain MG1655 cannot produce 3-aminoisobutyric acid; strain MG1655 (ΔptsGΔfumACΔfumB, panD, aspA, C24MTgm) could produce 82 mg/L of 3-aminoisobutyric acid; strain MG1655 (ΔptsGΔfumACΔfumB, panD, aspA, C24MTgm-M11) can produce 480 mg/L 3-aminoisobutyric acid. Compared to the wild type strain C24MTgm, the strain containing mutant C24MTgm-M11 has a significantly improved ability to produce 5.8-fold of 3-aminobutyric acid.

The invention claimed is:

1. A methyltransferase enzyme mutant C24MTgm-M11, which is derived from the wild type enzyme C24MTgm of SEQ ID NO: 1, wherein the methyltransferase enzyme mutant C24MTgm-M11 consists of the amino acid sequence of SEQ ID NO: 3.

2. The methyltransferase enzyme mutant C24MTgm-M11 according to claim 1, wherein the methyltransferase enzyme mutant C24MTgm-M11 is encoded by a polynucleotide comprising the nucleic acid sequence of SEQ ID NO: 4.

* * * * *

SEQUENCE LISTING

<160> NUMBER OF SEQ ID NOS: 4

<210> SEQ ID NO 1
<211> LENGTH: 367
<212> TYPE: PRT
<213> ORGANISM: Glycine max

<400> SEQUENCE: 1

Met Gln Lys Lys Lys Lys Asn Arg Asn Glu Val Val Leu Cys Ser Ala

```
            1               5                  10                 15
         Glu Gly Thr Gly Gly Cys Ser Arg Leu Ala Ala Met Asp Leu Ala Ser
                         20                 25                 30

Asn Leu Gly Gly Lys Ile Asp Lys Ala Glu Val Leu Ser Ala Val Gln
                         35                 40                 45

Lys Tyr Glu Lys Tyr His Val Cys Tyr Gly Gly Gln Glu Glu Glu Arg
                         50                 55                 60

Lys Ala Asn Tyr Thr Asp Met Val Asn Lys Tyr Tyr Asp Leu Val Thr
         65                  70                 75                 80

Ser Phe Tyr Glu Phe Gly Trp Gly Glu Ser Phe His Phe Ala Pro Arg
                         85                 90                 95

Trp Lys Gly Glu Ser Leu Arg Glu Ser Ile Lys Arg His Glu His Phe
                         100                105                110

Leu Pro Leu Gln Leu Gly Leu Lys Pro Gly Gln Lys Val Leu Asp Val
                         115                120                125

Gly Cys Gly Ile Gly Gly Pro Leu Arg Glu Ile Ser Arg Phe Ser Ser
                         130                135                140

Thr Ser Ile Thr Gly Leu Asn Asn Asn Glu Tyr Gln Ile Thr Arg Gly
         145                 150                155                160

Lys Glu Leu Asn Arg Ile Ala Gly Val Asp Lys Thr Cys Asn Phe Val
                         165                170                175

Lys Ala Asp Phe Met Lys Met Pro Phe Pro Asp Asn Ser Phe Asp Ala
                         180                185                190

Val Tyr Ala Ile Glu Ala Thr Cys His Ala Pro Asp Ala Tyr Gly Cys
                         195                200                205

Tyr Lys Glu Ile Phe Arg Val Leu Lys Pro Gly Gln Tyr Phe Ala Ala
                         210                215                220

Tyr Glu Trp Cys Met Thr Asp Ser Phe Asp Pro Gln Asn Pro Glu His
         225                 230                235                240

Gln Lys Ile Lys Ala Glu Ile Glu Ile Gly Asp Gly Leu Pro Asp Ile
                         245                250                255

Arg Leu Thr Ala Lys Cys Leu Glu Ala Leu Lys Gln Ala Gly Phe Glu
                         260                265                270

Val Ile Trp Glu Lys Asp Leu Ala Val Asp Ser Pro Leu Pro Trp Tyr
                         275                280                285

Leu Pro Leu Asp Lys Ser His Phe Ser Leu Ser Ser Phe Arg Leu Thr
                         290                295                300

Ala Val Gly Arg Leu Phe Thr Lys Asn Met Val Lys Val Leu Glu Tyr
         305                 310                315                320

Val Gly Leu Ala Pro Lys Gly Ser Leu Arg Val Gln Asp Phe Leu Glu
                         325                330                335

Lys Ala Ala Glu Gly Leu Val Glu Gly Gly Lys Arg Glu Ile Phe Thr
                         340                345                350

Pro Met Tyr Phe Phe Leu Ala Arg Lys Pro Asp Leu Asp Arg Asn
                         355                360                365

<210> SEQ ID NO 2
<211> LENGTH: 1104
<212> TYPE: DNA
<213> ORGANISM: Glycine max

<400> SEQUENCE: 2
atgcagaaga aaaagaaaaa tcgcaacgag gtggtgctgt gcagcgcaga aggtactggt     60
ggttgtagcc gtttagccgc aatggatctg gccagcaatc tgggcggcaa gattgacaaa    120
```

```
gccgaagtgc tgagcgccgt gcagaaatat gagaaatatc atgtgtgcta tggcggccaa    180
gaagaagagc gtaaggccaa ctacaccgac atggtgaaca gtattacga tctggtgacc     240 agtttctacg agtttggctg gggtgagagc tttcatttcg ccccgcgctg aaaggtgag    300 agcttacgcg agagcatcaa gcgccatgaa catttttac ctctgcagct gggtctgaaa    360
cccggtcaga aagtgctgga tgtgggttgt ggcattggtg gcccgctgcg tgaaatcagc    420
cgctttagca gtaccagtat caccggttta acaacaacg agtatcagat cacccgcggc    480
aaagagctga atcgcattgc tggtgtggac aaaacttgta acttcgtgaa ggccgacttt    540
atgaagatgc cgttcccgga caacagcttc gatgccgtgt acgccattga agccacttgt    600
catgcccccg atgcatacgg ctgctacaaa gagatcttcc gcgtgctgaa accgggccag    660
tattttgccg cctacgagtg gtgcatgacc gatagctttg acccgcagaa cccggagcac    720
cagaaaatta agccgagat cgaaatcggt gatggtttac cggatatccg tctgaccgca     780
aaatgtttag aagcactgaa gcaagctggt ttcgaagtga ctgggaaaa ggatctggcc     840 gtggatagcc cgctgccgtg gtatctgccg ctggacaaaa gccacttttc tttaagtagc    900
tttcgtttaa ccgccgttgg ccgtttattt accaagaaca tggtgaaggt gctggagtat    960
gttggtttag cacctaaagg cagtctgcgc gtgcaagatt ttctggaaaa agcagccgag   1020
ggtctggttg agggtggcaa acgcgagatt tttaccccga tgtacttctt tctggcccgt   1080
aaaccggatc tggatcgtaa ttaa                                           1104

<210> SEQ ID NO 3
<211> LENGTH: 367
<212> TYPE: PRT
<213> ORGANISM: Artificial Sequence
<220> FEATURE:
<223> OTHER INFORMATION: The amino acid sequence of a C24MTgm-M11 mutant

<400> SEQUENCE: 3

Met Gln Lys Lys Lys Asn Arg Asn Glu Val Val Leu Cys Ser Ala
1               5                   10                  15

Glu Gly Thr Gly Gly Cys Ser Arg Leu Ala Ala Met Asp Leu Ala Ser
            20                  25                  30

Asn Leu Gly Gly Lys Ile Asp Lys Ala Glu Val Leu Ser Ala Val Gln
        35                  40                  45

Lys Tyr Glu Lys Tyr His Val Cys Tyr Gly Gly Gln Glu Glu Arg
    50                  55                  60

Lys Ala Asn Tyr Thr Asp Met Val Asn Lys Tyr Tyr Asp Leu Val Thr
65                  70                  75                  80

Ser Phe Tyr Glu Phe Gly Trp Gly Glu Ser Phe His Phe Ala Pro Arg
                85                  90                  95

Trp Lys Gly Glu Ser Leu Arg Glu Ser Ile Lys Arg His Glu His Phe
            100                 105                 110

Leu Pro Leu Gln Leu Gly Leu Lys Pro Gly Gln Lys Val Leu Asp Val
        115                 120                 125

Gly Cys Gly Ile Gly Gly Ala Ala Arg Glu Ile Ser Arg Phe Ser Ser
    130                 135                 140

Thr Ser Ile Thr Gly Leu Asn Asn Asn Glu Tyr Gln Ile Thr Arg Gly
145                 150                 155                 160

Lys Glu Leu Asn Arg Ile Ala Gly Val Asp Lys Thr Cys Asn Phe Val
                165                 170                 175

Lys Ala Asp Phe Met Lys Met Pro Phe Pro Asp Asn Ser Phe Asp Ala
```

```
                180              185              190
Val Tyr Ala Ile Glu Ala Thr Cys His Ala Pro Asp Ala Tyr Gly Cys
        195                 200                 205

Tyr Lys Glu Ile Ser Arg Val Leu Lys Pro Gly Gln Tyr Phe Ala Ala
        210                 215                 220

Tyr Glu Trp Cys Met Thr Asp Ser Phe Asp Pro Gln Asn Pro Glu His
225                 230                 235                 240

Gln Lys Ile Lys Ala Glu Ile Glu Ile Gly Asp Gly Leu Pro Asp Ile
                    245                 250                 255

Arg Leu Thr Ala Lys Cys Leu Glu Ala Leu Lys Gln Ala Gly Phe Glu
            260                 265                 270

Val Ile Trp Glu Lys Asp Leu Ala Val Asp Ser Pro Leu Pro Trp Tyr
        275                 280                 285

Leu Pro Leu Asp Lys Ser His Phe Ser Leu Ser Ser Phe Arg Leu Thr
            290                 295                 300

Ala Val Gly Arg Leu Phe Thr Lys Asn Met Val Lys Val Leu Glu Tyr
305                 310                 315                 320

Val Gly Leu Ala Pro Lys Gly Ser Leu Arg Val Gln Asp Phe Leu Glu
                    325                 330                 335

Lys Ala Ala Glu Gly Leu Val Glu Gly Gly Lys Arg Glu Ile Phe Thr
            340                 345                 350

Pro Met Tyr Phe Phe Leu Ala Arg Lys Pro Asp Leu Asp Arg Asn
        355                 360                 365

<210> SEQ ID NO 4
<211> LENGTH: 1104
<212> TYPE: DNA
<213> ORGANISM: Artificial Sequence
<220> FEATURE:
<223> OTHER INFORMATION: The nucleic acid sequence of a C24MTgm-M11
      mutant

<400> SEQUENCE: 4
atgcagaaga aaagaaaaa tcgcaacgag gtggtgctgt gcagcgcaga aggtactggt       60
ggttgtagcc gtttagccgc aatggatctg ccagcaatc tgggcggcaa gattgacaaa      120
gccgaagtgc tgagcgccgt gcagaaatat gagaaatatc atgtgtgcta tggcggccaa     180
gaagaagagc gtaaggccaa ctacaccgac atggtgaaca gtattacga tctggtgacc      240 agtttctacg agtttggctg gggtgagagc tttcatttcg ccccgcgctg gaaaggtgag     300
agcttacgcg agagcatcaa cgccatgaa cattttttac ctctgcagct gggtctgaaa     360
cccggtcaga aagtgctgga tgtgggttgt ggcattggtg gcgcagcacg tgaaatcagc     420
cgctttagca gtaccagtat caccggttta acaacaacg agtatcagat caccccgcggc    480 aaagagctga tcgcattgc tggtgtggac aaaacttgta acttcgtgaa ggccgacttt     540
atgaagatgc cgttcccgga caacagcttc gatgccgtgt acgccattga agccacttgt    600
catgcccccg atgcatacgg ctgctacaaa gagatcagcc gcgtgctgaa accgggccag    660
tattttgccg cctacgagtg gtgcatgacc gatagctttg acccgcagaa cccggagcac    720
cagaaaatta agccgagat cgaaatcggt gatggtttac cggatatccg tctgaccgca    780
aaatgtttag aagcactgaa gcaagctggt ttcgaagtga tctgggaaaa ggatctggcc    840
gtggatagcc cgctgccgtg gtatctgccg ctggacaaaa gccacttttc tttaagtagc    900
tttcgtttaa ccgccgttgg ccgtttattt accaagaaca tggtgaaggt gctggagtat    960
gttggtttag cacctaaagg cagtctgcgc gtgcaagatt ttctggaaaa agcagccgag   1020
```

-continued

```
ggtctggttg agggtggcaa acgcgagatt tttaccccga tgtacttctt tctggcccgt    1080
aaaccggatc tggatcgtaa ttaa                                           1104
```